(12) United States Patent
Frisbee, Jr.

(10) Patent No.: US 8,009,084 B1
(45) Date of Patent: Aug. 30, 2011

(54) FULLY INTEGRATED MICROPROCESSOR CONTROLLED RADAR DISPLAY

(75) Inventor: Belmont Frisbee, Jr., Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/610,204

(22) Filed: May 14, 1984

(51) Int. Cl.
*G01S 7/40* (2006.01)
(52) U.S. Cl. .................................. 342/165; 342/169
(58) Field of Classification Search .................. 342/165, 342/169, 172
See application file for complete search history.

(56) References Cited

U.S. PATENT DOCUMENTS

| | | | | |
|---|---|---|---|---|
| 3,810,174 | A | 5/1974 | Heard et al. | 343/5 DP |
| 4,002,827 | A | 1/1977 | Nevin et al. | 343/5 SC |
| 4,164,739 | A | 8/1979 | Katagi | 343/5 SC |
| 4,167,821 | A * | 9/1979 | Gibson et al. | 364/578 |
| 4,197,583 | A * | 4/1980 | Westell et al. | 364/521 |
| 4,205,313 | A | 5/1980 | Pease | 343/5 DP |
| 4,214,269 | A | 7/1980 | Parker et al. | 358/140 |
| 4,241,412 | A | 12/1980 | Swain | 364/731 |

* cited by examiner

*Primary Examiner* — Mark Hellner
(74) *Attorney, Agent, or Firm* — Melvin L. Swilka; Thomas G. Keough; James M. Saunders

(57) ABSTRACT

A special purpose decoder and display unit is designed to present special format radar signals for training. Several display formats ease operator workload while acquiring desired radar formats. A reference tone is recorded along with radar signals on a tape and a phase locked oscillator receives the reference tone which has the same fluctuations that the recorded radar signals have. A controlled computer and the phase locked oscillator feed their signals to a frequency synthesizer that creates a fine tuned signal based on the output signals of the phase locked oscillator and the computer. A timing generator is coupled to receive the output of the frequency synthesizer and it generates special purpose timing signals which are fed to a display. A video input receives radar signals coming from the tape, for example, to generate a sense directed, gain controlled video signal. A planned position indicator converter receives the gain controlled video signal and processes the signal from polar to rectangular coordinates in accordance with directions from the control computer so that a display unit can appropriately show the information contents of the video input signal without the wow and flutter that might otherwise be attributable to speed inconsistencies of the tape.

9 Claims, 16 Drawing Sheets

US 8,009,084 B1

FULLY INTEGRATED MICROPROCESSOR CONTROLLED RADAR DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radar displays and the means by which improved radar displays are presented. More particularly the invention concerns the display of radar information in a variety of formats in a selective manner without calling for needless complexity of associated equipments. In yet greater particularity the invention provides for the display of radar information, for example, for training purposes, having the radar information recorded on a tape along with a recorded reference tone such that the display is not adversely affected by speed inconsistencies of the tape that would otherwise introduce what is commonly referred to as wow and flutter in the displayed radar images.

The evolution of radars has been a nearly non-stop effort since its inception. Increased capabilities that are currently practiced are far beyond what, only a short time ago, was thought to be impossible. The state-of-the-art continues to advance at a rate which makes the training of operating personnel more and more difficult.

Complex expensive systems operationally disposed cannot be taken off-line for routine training activities nor can they be used as a tool to give needed simulations for sharpening the skills in situations which vary from the ordinary. Although some training aids have been designed which keep pace with systems in the field, they have been expensive, complex and require discrete special purpose circuitry. The hardware and associated software also compounded the problems of maintenance personnel since these equipments also needed to be serviced. In one form or another the various formats could be presented yet usually increased complexity of the overall system was the price that had to be paid. There seems to be little available in the sense of a training aid or system calibration device which can use taped radar presentations that can compensate for the imperfections of the recording and playback circuitry.

Thus there is a continuing need in the state-of-the-art for a cost effective, relatively uncomplicated display and its associated control unit which can accommodate taped radar information and show it in a variety of formats.

SUMMARY OF THE INVENTION

The present invention is directed to providing an apparatus for decoding and displaying radar signals in different formats. A means provides a reference frequency source on a tape alongside and in the same time frame as a means of providing a source of video signals on the same tape. A means is coupled to receive the variable reference frequency for outputting a signal that is phase locked to the variable reference frequency. A control computer and the phase locked outputting means are coupled to a means for synthesizing a fine tuned signal based on the outputs of the phase locked signal generating means in accordance with the signals received from the control computer. A means is coupled to receive the output from the synthesizing means to generate special purpose timing signals as directed by the control computer and the means is disposed to receive the video input signal from the video signal providing means for producing a sense directed gain controlled video signal. A plan position indicator converter is coupled to receive the video output of the producing means and to process the video output from polar to rectilinear coordinates in accordance with signals received from the control computer. A display is coupled to the plan position converter for showing the radar signals in different formats without objectionable fluctuations in response to instructions coming from a control panel.

A prime object of the invention is to provide an improved radar display.

Yet another object of the invention is to provide a display capable of showing taped radar information without wow and flutter that may be caused by inconsistencies of the tape rate.

Yet another object is to provide an improved radar display having the capability for providing information a number of different formats.

Still another object of the invention is to provide a control unit for a display that accommodates taped radar display information and presents it in different formats.

Still another object of the invention is to provide a display control unit that is compact in size and of reduced complexity to reduce the cost associated with procurement and training.

Yet another object is to provide a display control unit for radar displays that is adaptable to a commercially available display.

These and other objects of the invention will become more readily apparent from the ensuing description and drawings when taken with the appended claims.

DESCRIPTION OF THE PREFERRED EMBODIMENT

Figure 1:
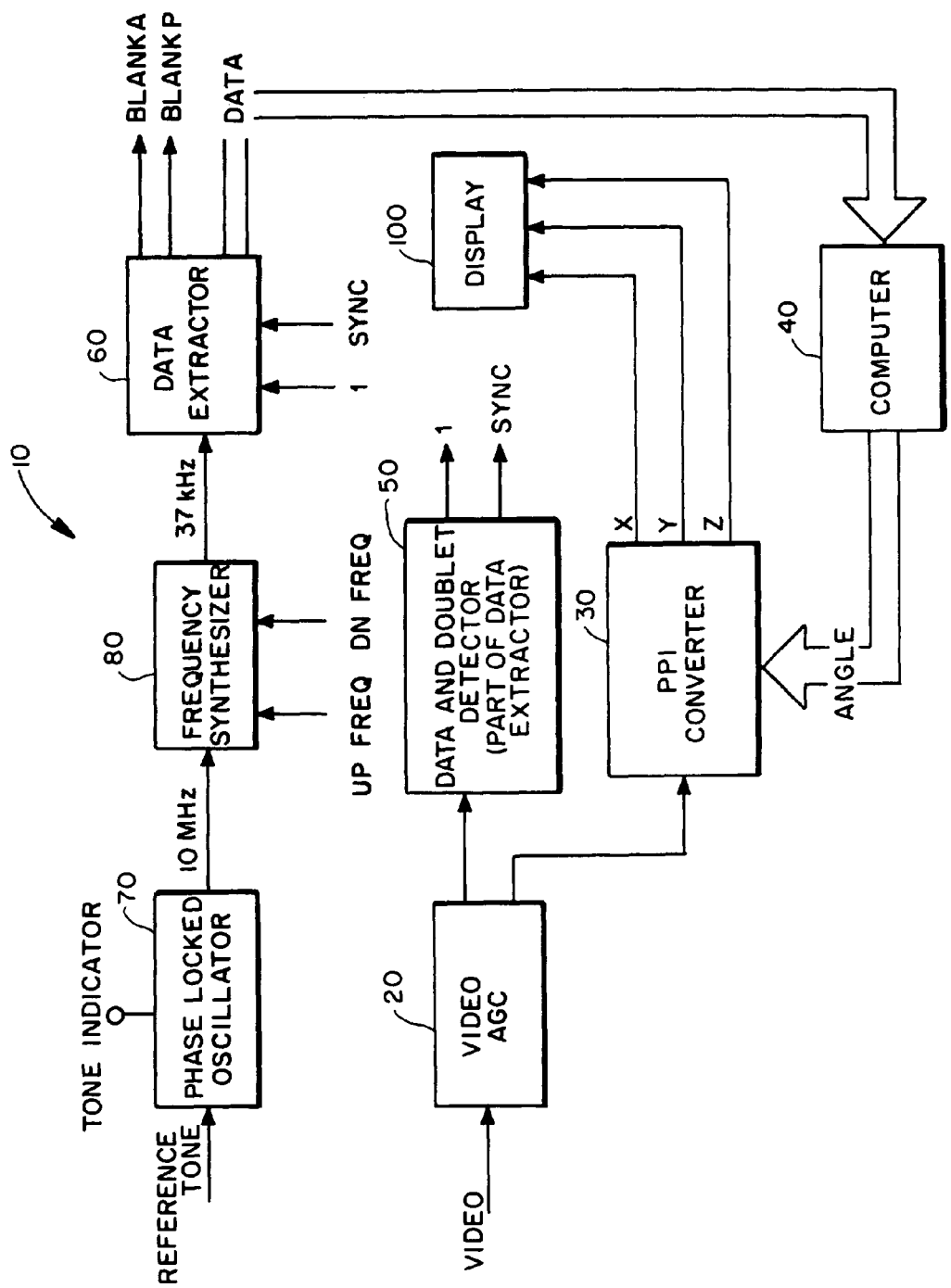
FIG. 1 shows a block diagram representation of the principal constituents of the training radar display.

Referring now to FIG. 1 of the drawings a training radar display 10 receives signals representative of visual information and provides for a showing of the information on a display 100. In this regard the training radar display is to be considered as a special-purchase decoder and display unit designed to present special-format radar signals. The signals are displayed in several display formats for easing operator workload while acquiring desired radar formats.

The display can be one of several commercially available units; however, for purposes of realizing the capabilities of the training radar display, a Model 1340aXY display marketed by Hewlett-Packard Corporation has been selected to provide the video displays in a variety of formats. A thorough understanding of the operation and makeup of the Hewlett-Packard display can be obtained from the operating and service manual, manual part No. 01340-90901 obtained from Hewlett-Packard Co., Colorado Springs Division, 1900 Garden of the Gods Road, Colorado Springs, Colo., USA.

Details of operation of the display unit can be obtained from the manual; however, the unit has a P-7 phosphor, which provides the necessary long persistence that a PPI radar display requires. In addition a light-emitting diode alphanumeric display is provided to show various messages and numeric data that are extracted from an incoming signal.

Figure 6A:
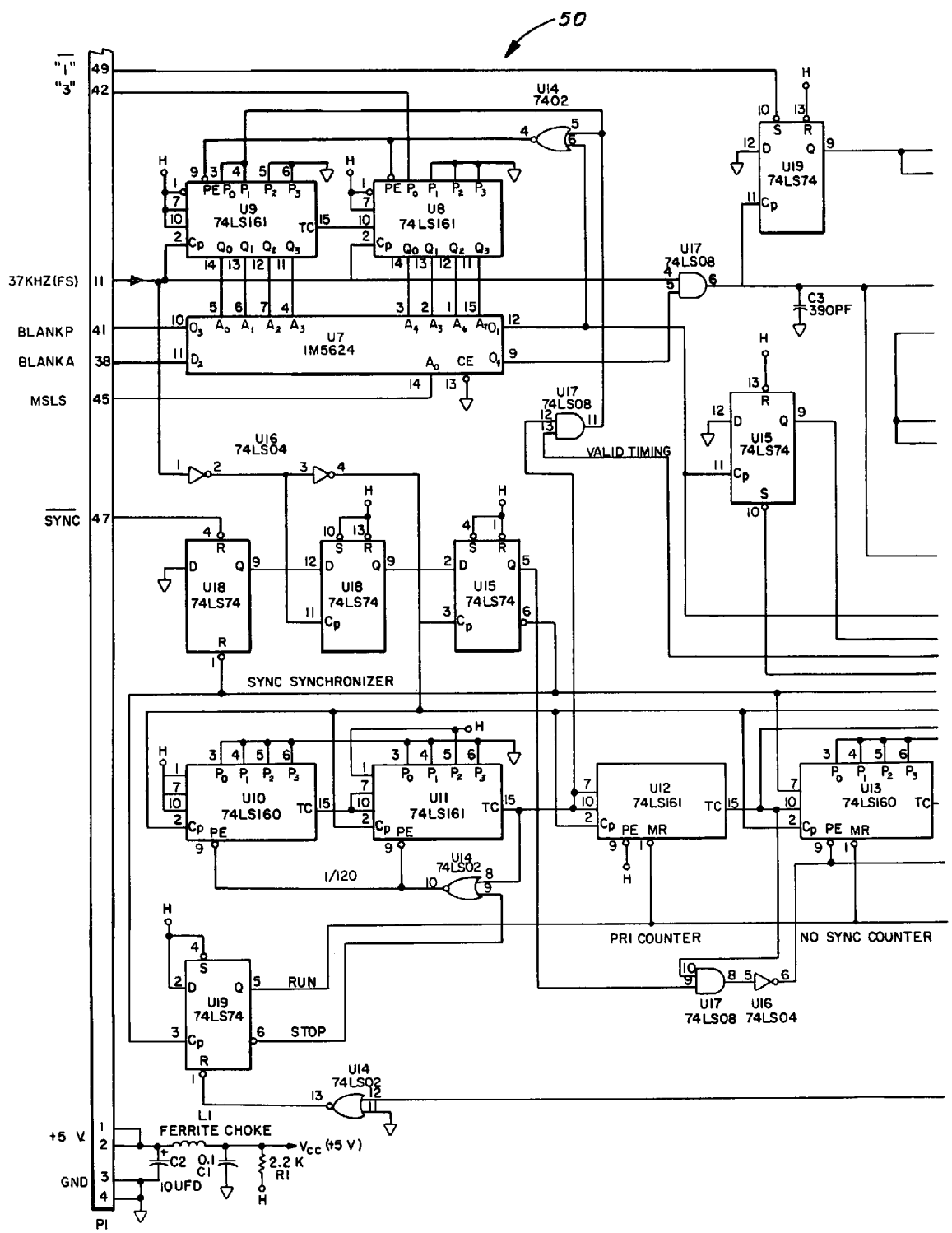
FIGS. 6a and 6b are detailed schematic diagrams of the data extractor card.
Figure 6A:
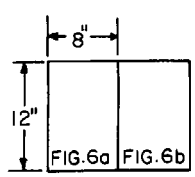
Figure 6B:
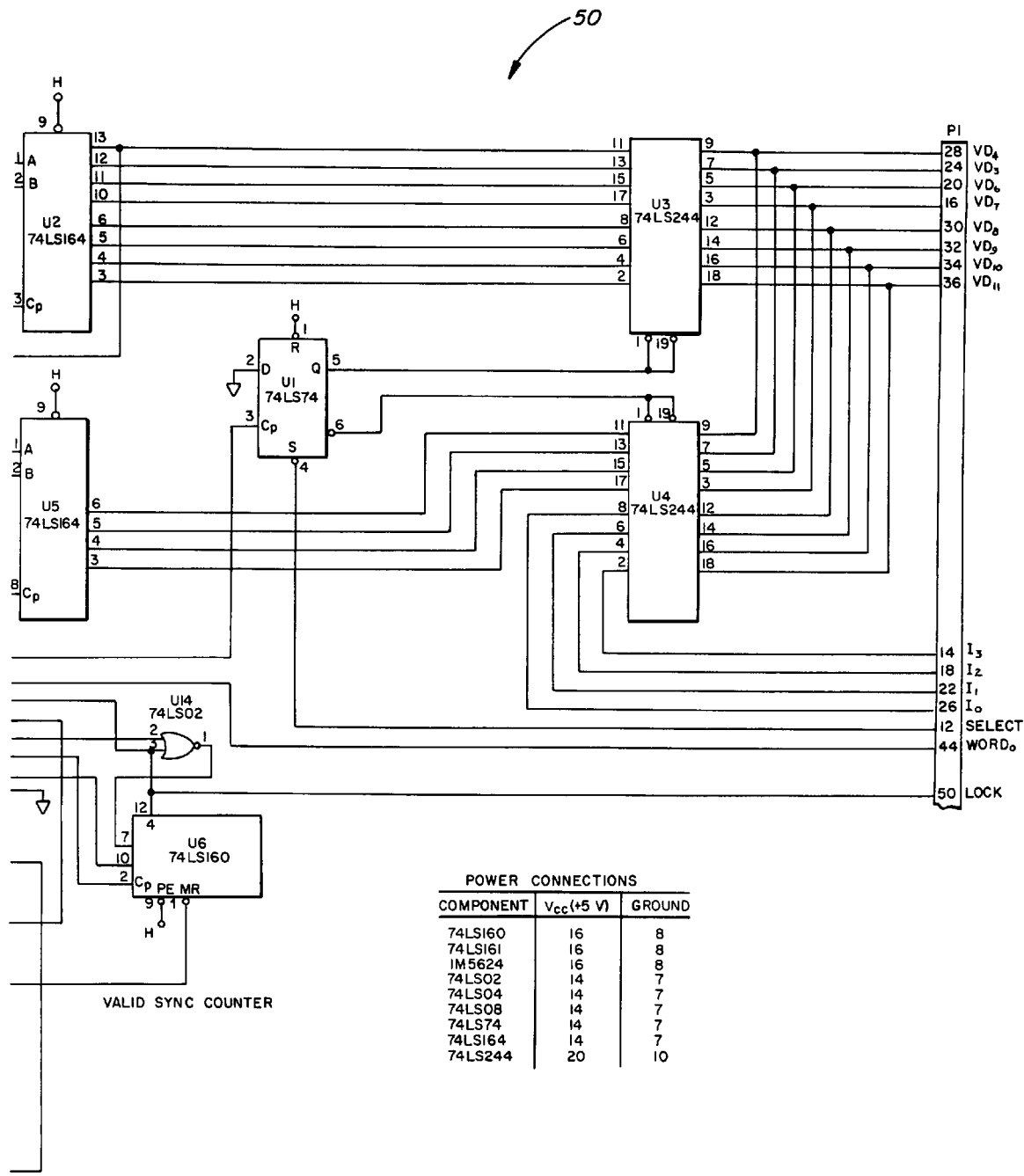

The prime function of the training radar display is to properly format, condition, and display the incoming video signals. The video signals can originate on, for example, a magnetic tape which contains all the information of a radar display. Along with the video signals on the same tape and in the same time frame, a video information tone comes in first to the video automatic gain control circuit 20 on to a pulse position indicator converter 30 and onto display 100. All system control is handed by a computer 40 which partially means that the display format control and interaction with the operator of the training radar display also are system control functions handled by the computer. Any digital pulses that are specially recorded with the radar video and are therefore present in the incoming video signal, are extracted by a data and doublet detector 50 which is actually a part of a data extractor circuit 60. In this regard the separate functions are depicted for purposes of clarity in FIG. 1 it being understood that later figures in the drawings, FIGS. 6a and 6b show the details of the data extractor and data and doublet detector as a combined unit.

The main system timing is derived from either a crystal reference or from a reference tone coincidentally recorded on the wideband tape containing the signal of interest appearing at the video input to video AGC 20. All precision frequencies and timing signals are derived from the crystal reference or from the reference tone by a phase locked oscillator 70. All precision frequencies and timing signals are derived from the crystal reference or reference tone and are generated from a 10 MHz signal within a frequency synthesizer 80 which is phase locked to either the reference tone or the phase-locked oscillator 70.

Figure 2:
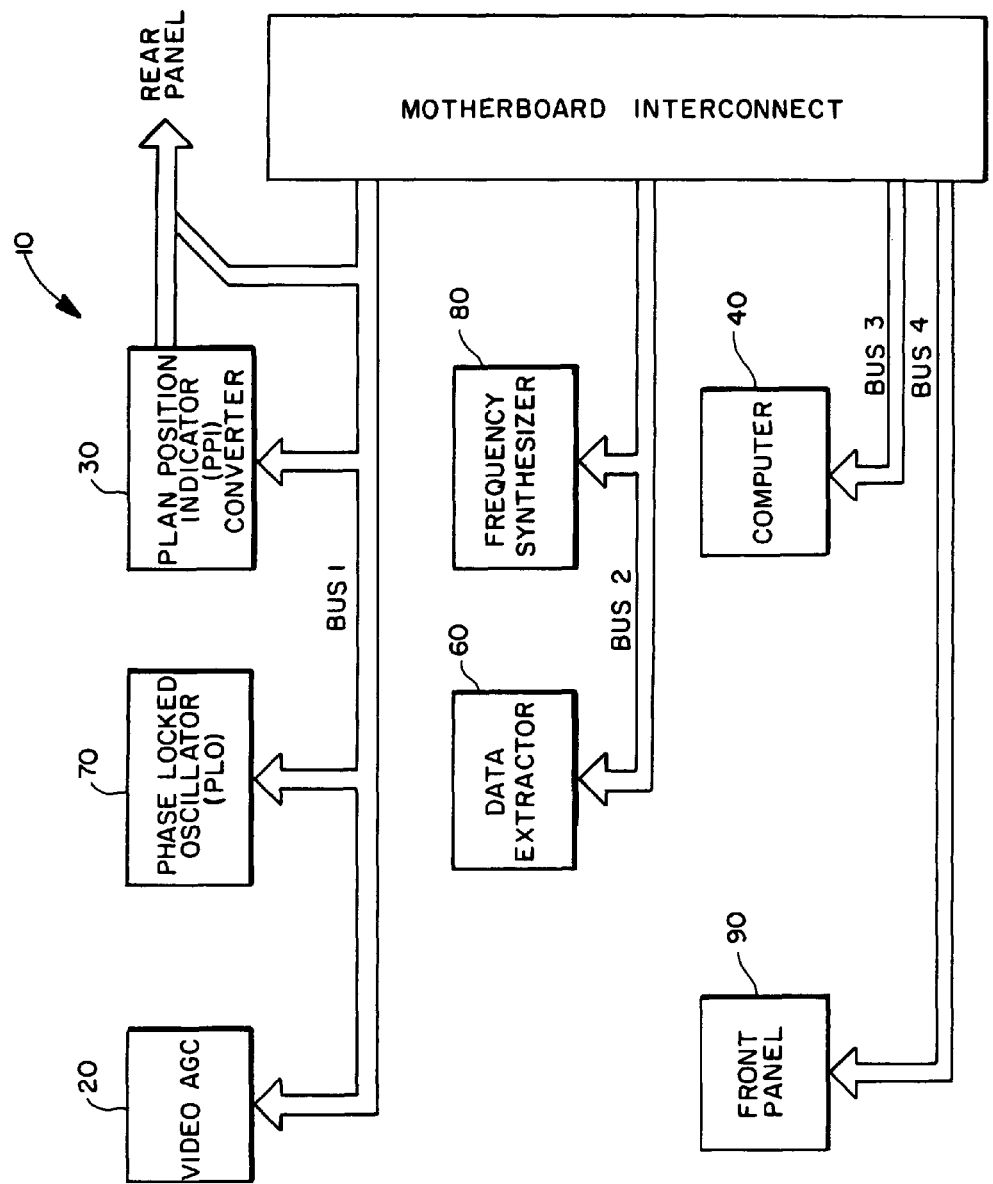
FIG. 2 depicts a bus diagram of the training radar display.

The various circuits in the training radar display are separately mounted on cards and have been designed to operate on common busses in order to ease interconnection requirements. These buses have been avoided in FIG. 2 of the drawings to avoid unduly complicating it. FIG. 2 shows the bus routings noting that a first bus is provided that contains signals that are common to all the circuitry within video AGC 20, phase locked oscillator 70 and plan position indicator converter 30. A second bus is used to interconnect data extractor circuit 60 and the circuitry of frequency synthesizer 80. A third bus is required for computer 40 because the bus size is limited to fifty wires and the computer requirements call for extensive input and output terminals.

Because the three busses mentioned above are filled by the described circuit components, interconnections to a front panel 90 are handled by a fourth bus. All required interconnections are done on a motherboard with wire wrap.

Figure 3:
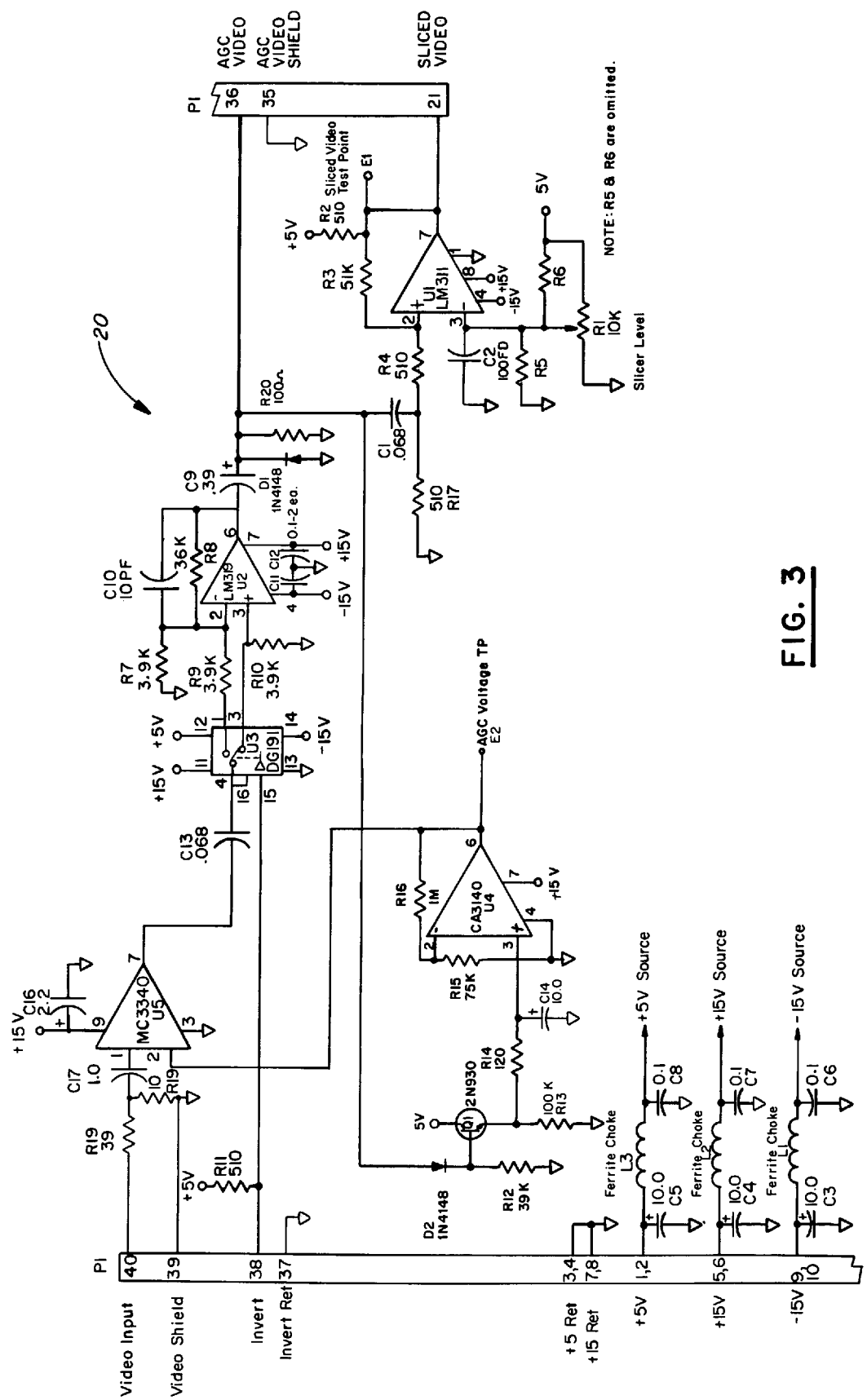
FIG. 3 sets forth the schematic of the video gain control circuitry.

The function of video automatic gain control circuit 20 is to buffer the input video that comes into the training radar display unit, see FIG. 3. If necessary this circuit also provides video inverting, and an automatic gain control function designed to keep the circuit output video constant. The circuit also provides a digital output, which gives a simple one-bit analog-to-digital conversion of the input signal.

Referring to FIG. 3 note that the function of R19 and R18 are the same as those of a voltage divider and an input-line termination. The voltage division ratio is 4:1 and C17 provides the AC coupling into U5. The function of U5 is to provide variable gain for controlling the automatic gain control. The U5 output is also AC-coupled with a fast-time constant capacitor C13. U3 provides the inverting or noninverting function to the input. The state of switch U3 is determined by the front-panel operator control called invert. Pull-up resistor R11 supplies a logic "1" when the front-panel switch is open. Inverting or noninverting is actually accomplished by U2, whether the input is supplied to the inverting input or to the noninverting input.

The amplifier gain is set to approximately 10. Diode D1 provides signal clamping to the ground. The combination of D1 and D2 detects the video output and holds the peak value of that value on capacitor C14. C14 charge time on a signal peak is very fast through resistor R14. However, in the absence of a signal, the charge on C14 leaks away through the combination of R14 and R13, with R13 being a large resistor. The decay time constant is long. This peak voltage is followed by amplifier U4 with a voltage gain of approximately fifteen. The resultant amplitude is representative of the input signal peaks and is fed back to the U5 gain-control input. This input forms the total feedback loop, controls the output gain, and holds this gain constant. An output sample is coupled through C1 to integrate at circuit U1. The function of U1 is that of a comparator with the threshold level set by R1.

Figure 4A:
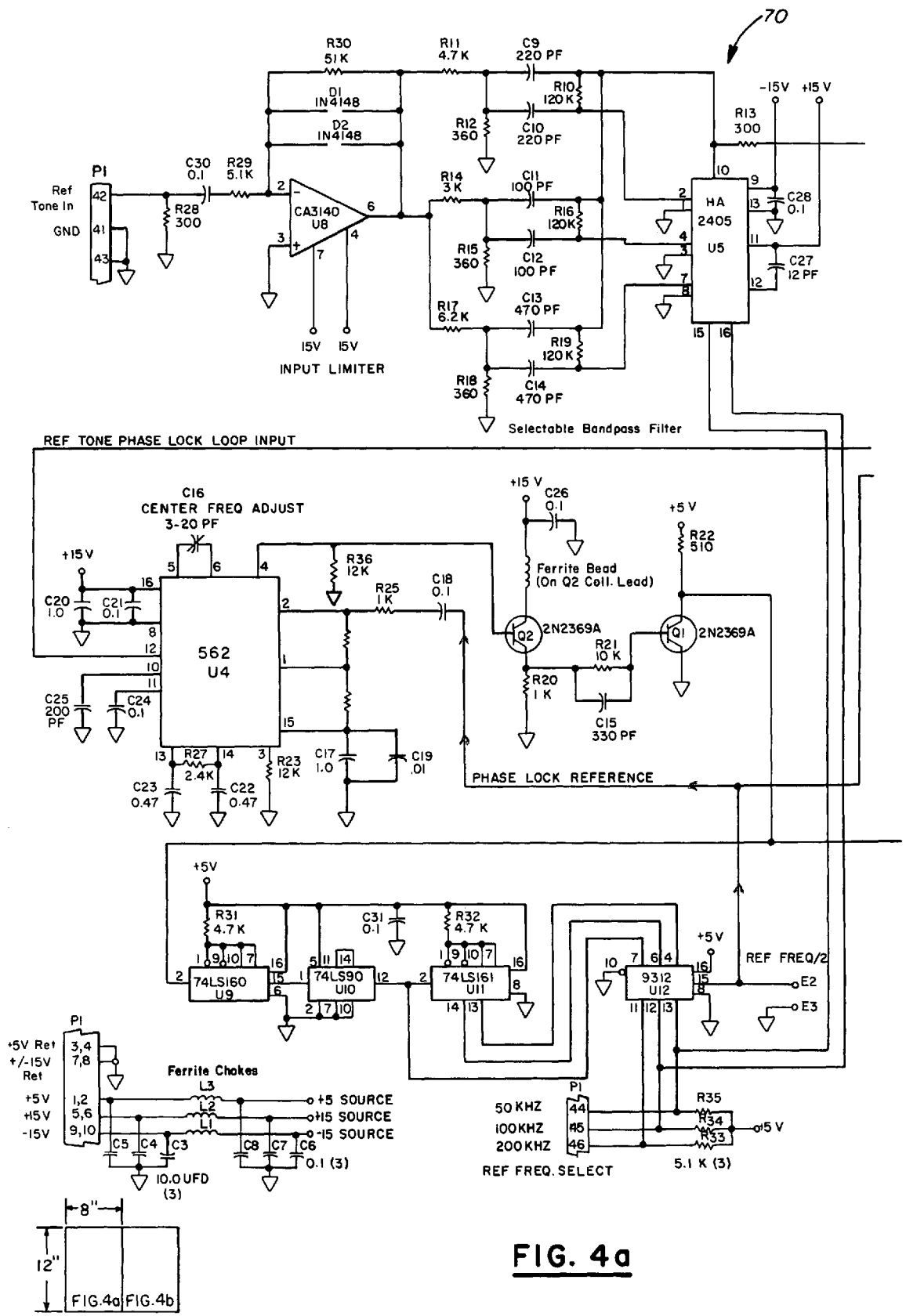
FIGS. 4a and 4b are schematic diagrams of the details of the reference tone, phase-locked oscillator.
Figure 4B:
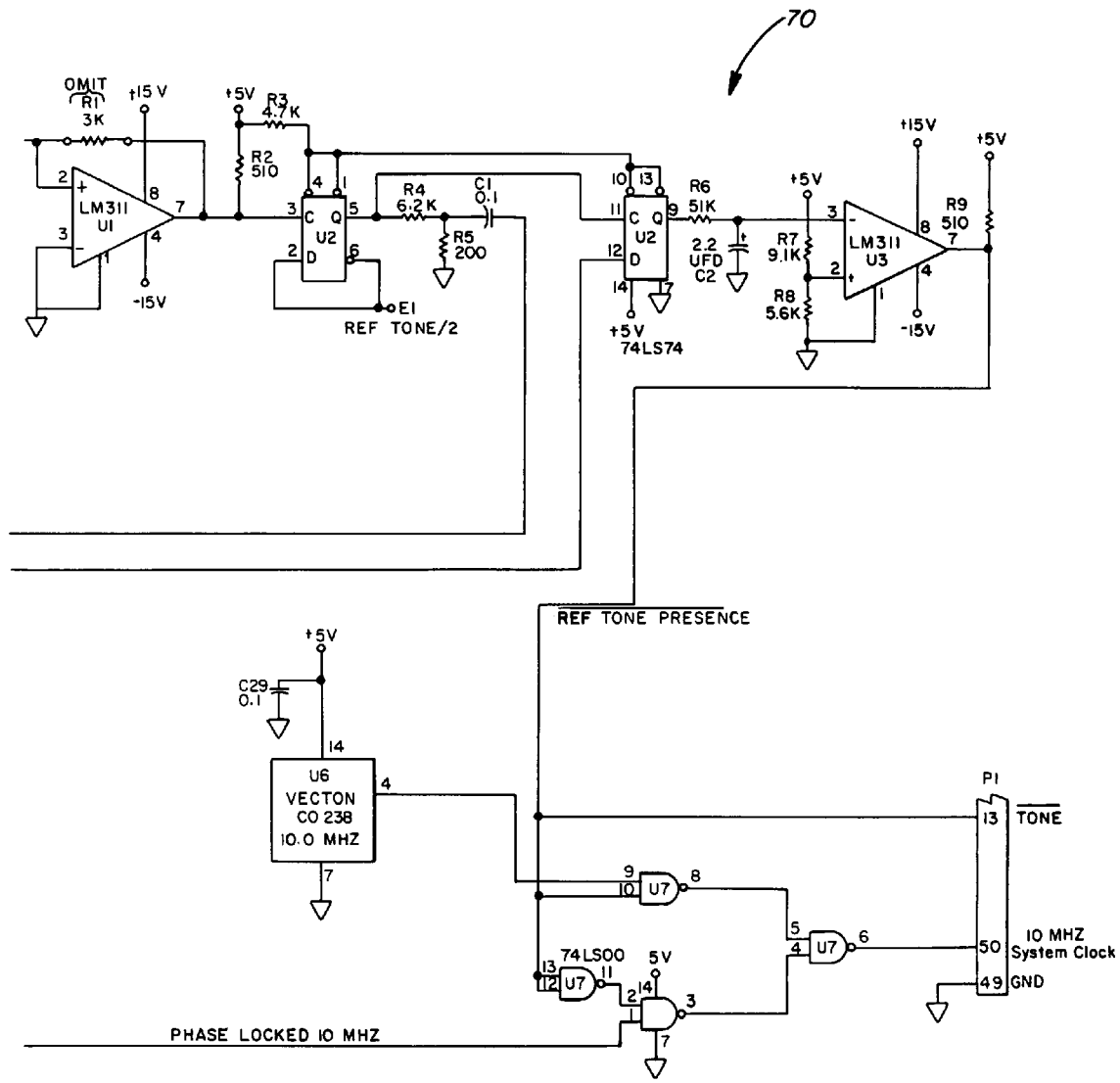

Looking to phase-locked oscillator circuit 70 of FIGS. 4a and 4b, the circuit depicted provides the timing signals for the entire training radar display. The timing signals are derived from a tape reference tone. That is to say, the reference tone shares space with the incoming video signal within the same time frame or time reference.

The tape reference tone is either a 50, 100, or 200 kHz sine wave that is terminated into a 300 ohm resistor R28 on the circuit. An input limiter consisting of U8 and diodes D1 and D2, limits the input signal while providing gain.

A bandpass filter separates the input signal to reduce any out-of-band component. The filters include resistors R11, R12, and R10, and capacitors C9 and C10 if the input frequency is 100 kHz. If the operator selects a reference-tone frequency of 50 kHz the components involved are resistors R17, R18, and R19 plus capacitors C13 and C14. For the 200 kHz selection the components are resistors R14, R15 and R16 and capacitors C11 and C12. The heart of this filter section is the multi-input operational amplifier U5.

The input selected is determined by a frequency select switch found on front panel 90. The active-filter output appears on N10. This output is further limited by U1 to a TTL logic, level square wave. The square wave may or may not be exactly 50% duty cycle. The rest of the circuitry demands that there be a perfect 50% duty cycle. In order to form a 50% duty a divider U2 is employed. The divider transitions between logic states only on the positive edge of the U1 signal. This output (available on a test point E1) forms the basis for the phase-lock loop of this circuit.

A signal is then passed into U4 (the actual phase-lock loop integrated circuit) as the reference input. Pin 4 on U4 is the 10 MHz low-level, phase-locked signal. Transistors Q1 and Q2 buffer that low-level signal into a signal compatible with TTL levels.

This process forms a clock for the entire display when the reference-tone input is used. In order to complete the phase-lock loop the 10 MHz signal is divided by U9, U10, and U11 to one of three frequencies. These three frequencies are 25 kHz which is available on pin 13 of U11; 50 kHz, available on pin 14 of U11; and 100 kHz available on pin 2 of U11. One of these three signals is selected by multiplexer U12. The U12 output on pin 15 and on test point E2 is used to feed back into U4 as the phase-lock reference. U4 compares this phase-lock reference with the input signal from the reference-tone input and adjusts the 10 MHz output to keep up with any wow and flutter that may be present in the reference-tone input.

Circuitry composed of U2 and U3 monitors the reference-tone input to determine when phase-lock has occurred. If phase-lock has occurred, then the circuit assumes that there is a reference-tone present. The reference-tone presence line on the screen falls to the lower level of the screen (negative logic) and enables the phase-lock 10 MHz signal to exit the circuit on pin 50. If there is no lock on the circuit, the assumption is that the reference-tone is not being supplied and an internal crystal U6 supplies a stable 10 MHz signal for the remainder of the training radar display. Chokes L1, L2, L3, and their associated capacitors effectively bypass the power supplies for this circuit.

Figure 5A:
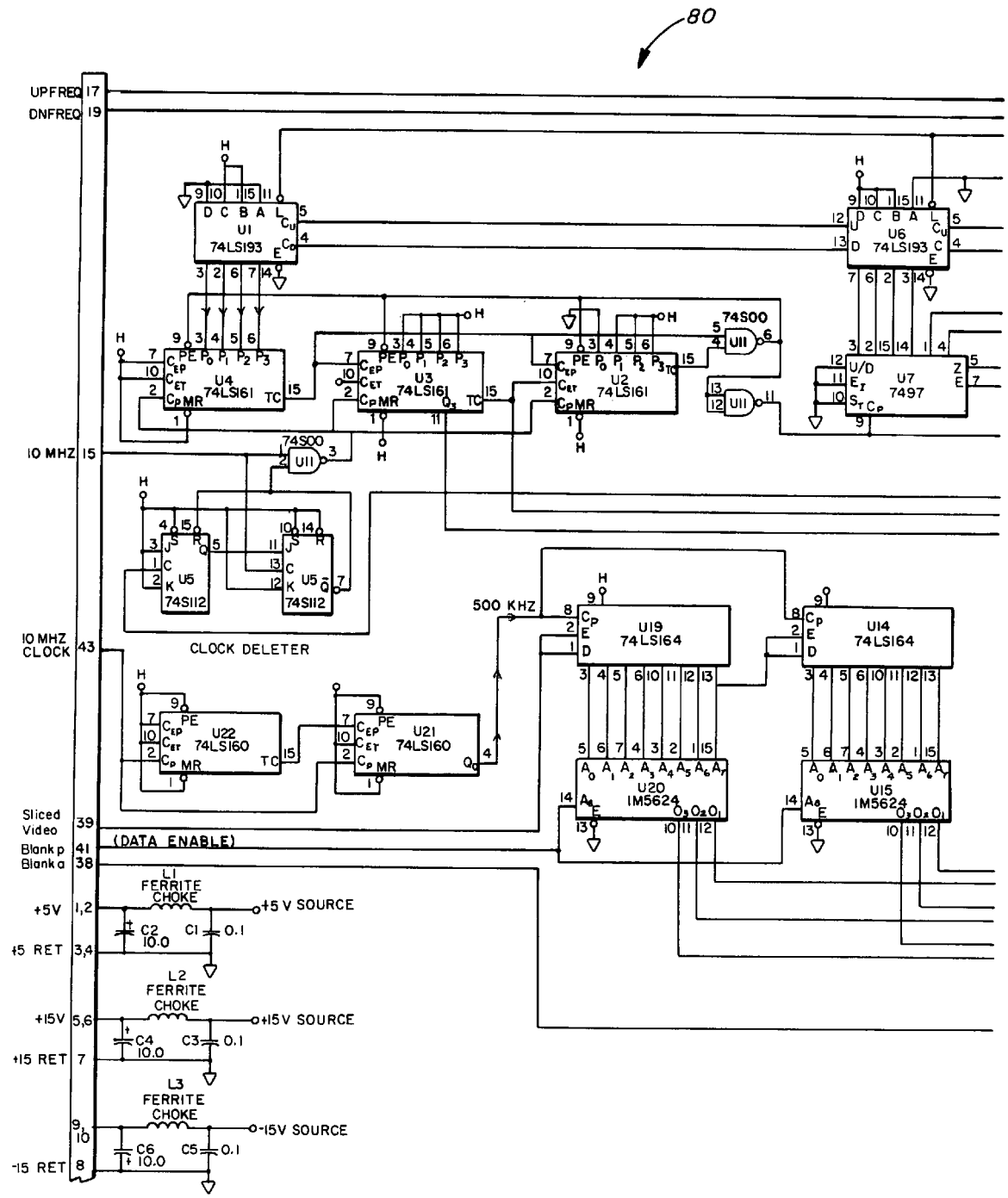
FIGS. 5a and 5b show the details of a schematic diagram for the frequency synthesizer.
Figure 5A:
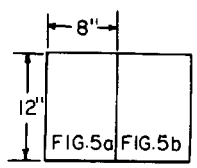
Figure 5B:
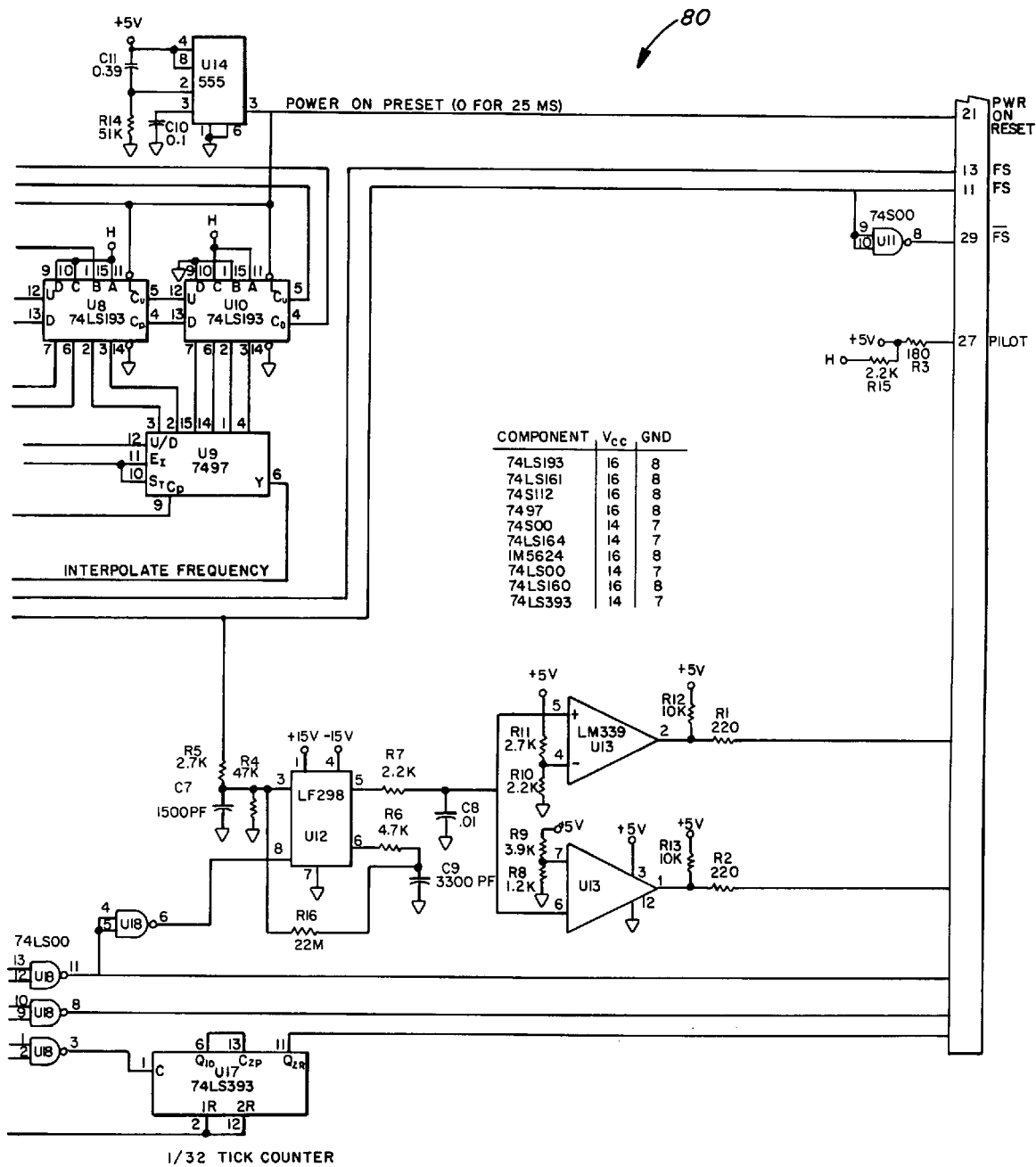

The frequency synthesizer 80 depicted in FIGS. 5a and 5b has two distinct functions. Each function will be discussed separately. The first function is to divide a 10 MHz master clock into a frequency that is only slightly adjustable. This 30 kHz frequency must have a digital resolution that is finer than a normal 10 MHz would allow. Generally, a digital divider has discrete frequency steps, with the finest of each step being 100 nanoseconds. However, with a unique interpolating frequency divider, the apparent resolution can go down by two orders of magnitude. The first frequency division takes place in U2, U3, and U4 and is a straightforward digital divider. This divider is variable in its division ratio. U3 and U2 are fixed; U4 is preset from the contents of U1. The contents in U1 are determined by a system computer 40.

Integrated U7 and U9 are rate multipliers that receive the approximate 37 kHz from U2. U7 and U9 generate an interpolate frequency that goes from 0 to 37 kHz depending on the input to integrated circuits U7 and U9. These integrated circuits come from U6, U8, and U10 and in turn are set by system computer 40.

The effect of the interpolate frequency is to subtract one clock pulse for every interpolate pulse. Pulse subtraction is done by the clock deleter circuit formed by U5. The instantaneous frequency that is generated by this circuit is 37 kHz. However, when the clock deleter effect is considered over a longer time, the resolution in the frequency that can be generated by this string of integration circuits is down to 25 ps. The outputs from this circuit appear on pins 11, 13, and 29. These pins are all of the same frequency, but they have different duty-cycle signals that are used in different ways throughout the remaining parts of the circuit to be discussed.

The second function of the circuitry of frequency synthesizer 80 is to handle the input digital data derived from the analog video signal. A 500 kHz clock is generated by U21 and U22. The function of this clock is to shift the digital data into a shift register, which is formed by U14 and U19. A digital representation of the input-pulse waveform is present at any instant in time in U14 and U19. U15 and U20 form a gate array, which is preprogrammed to look for the proper pulse width and interpulsed spacing of the input digital data.

An ancillary function of this card is to phase detect the digital bits that appear in the video input with respect to the master timing system. This phase detection is done by the sample-and-hold integrated circuit U12. A triangular wave present on pin 3 of U12 is sampled whenever a digital "1" is present. If the timing is correct, the resultant output voltage held on the output of U12 (pin 5) will be midway between the two voltage levels present on the comparator's input U13. However, if the digital "1" is either early or late with respect to the input triangle wave coming into pin 3 of U12, then the output voltage on pin 5 will either raise or lower and trip one of the two error thresholds associated with U13. The threshold comparator outputs will generate frequency errors called ERRORA and ERRORB, which are monitored by the system computer and can be used to raise or lower the synthesizer frequency on the frequency interpolator. By this method the total display timing is phase locked to the input video signal.

This raising and lowering is done by pulses on the UPFREQ and ENFREQ inputs to this circuit. These two inputs are counted up or down by the four counter integrated circuits, U1, U6, U8 and U10. The outputs of these counter integrated circuits form the preload for U4 and the rate multiplication factor for U7 and U9. L1, L2, and L3, and their associated capacitors effectively decouple the power supply from this circuit.

The function of data extractor 60 and data and doublet detector 50 first identified with respect to FIG. 1 are examined in detail with respect to the schematic diagrams of FIGS. 6a and 6b. And the functions are threefold. The first function is that of PRI generation. The 37 kHz signal from frequency synthesizer 80 enters on pin 11 and is divided by U9 and U8 to one of three division ratios. The division ratio selection depends on the radar display pulse repetition interval.

Programmable gate array U7 takes the U9 and U8 counter states and provides for output signals with prescribed wave shapes to the rest of the circuitry. Outputs 3 and 2 from U7 provide the blanking pulses called BLANKP and BLANKA. BLANKP is the PPI blanking pulse and has a long blank period so as to present only valid radar picture data. BLANKA is a very short pulse used only to return the display sweep to the edge of the screen in preparation for a second sweep. Other outputs from U7 form various timing functions. Output "1" (O1) is the preset pulse that turns counters U8 and U9 back to the beginning so that the process may start over. In conjunction with the 37 KHz input signal, output 4 is used to clock the data-load shift registers U2 and U5 in preparation for data recovery by computer 40.

The input data appears on pin 49 and is buffered and held by U19. At proper time and in proper phase with the input signal, shift registers U2 and U5 will move the digital portion of the waveform into the shift register. This data is held and sampled by U3 and U4. U3 and U4 are under computer control and form a sequential data recovery system. The computer interrogates this circuit and reads the data from U3. After the data has been successfully read from U3, a pulse on the select line changes the output data to data held by U5. This data is buffered out by integrated circuit U4. The computer is able to read all of the digital data with two data read operations.

Integrated circuits U10, U11, U12, U13 and U6 form a state machine, which is used to find the proper sync pulse position and to rephase counters U9 and U8. Once the operator has manipulated the hold control to make the waveform stationary on the "A" sweep display, this circuitry examines the input signal to find the sync pulse. Once the sync pulse has been successfully found, the circuitry rephases the main counters U8 and U9.

Figure 7A:
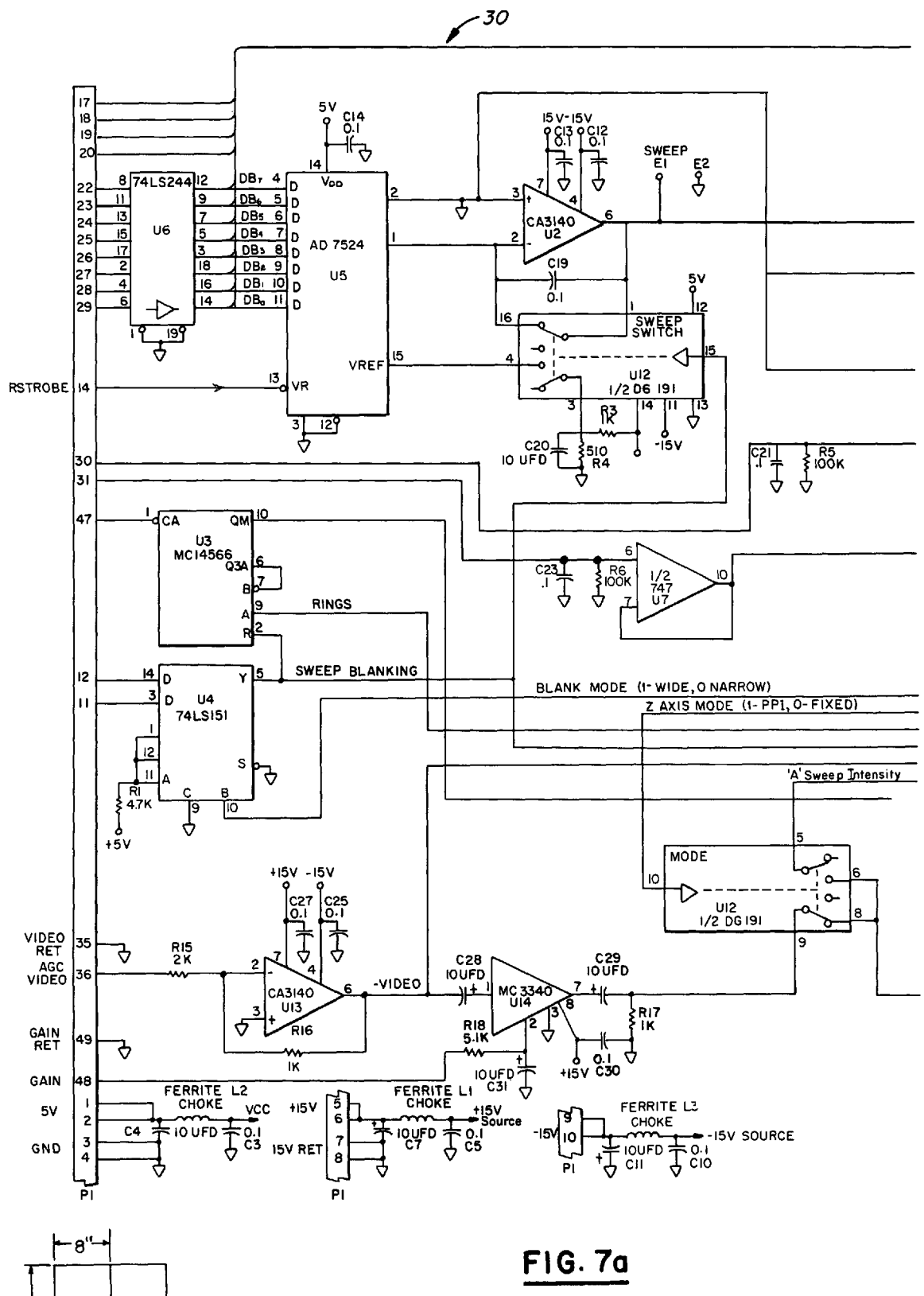
FIGS. 7a and 7b are schematic diagrams of the pulse position indicator converter.
Figure 7B:
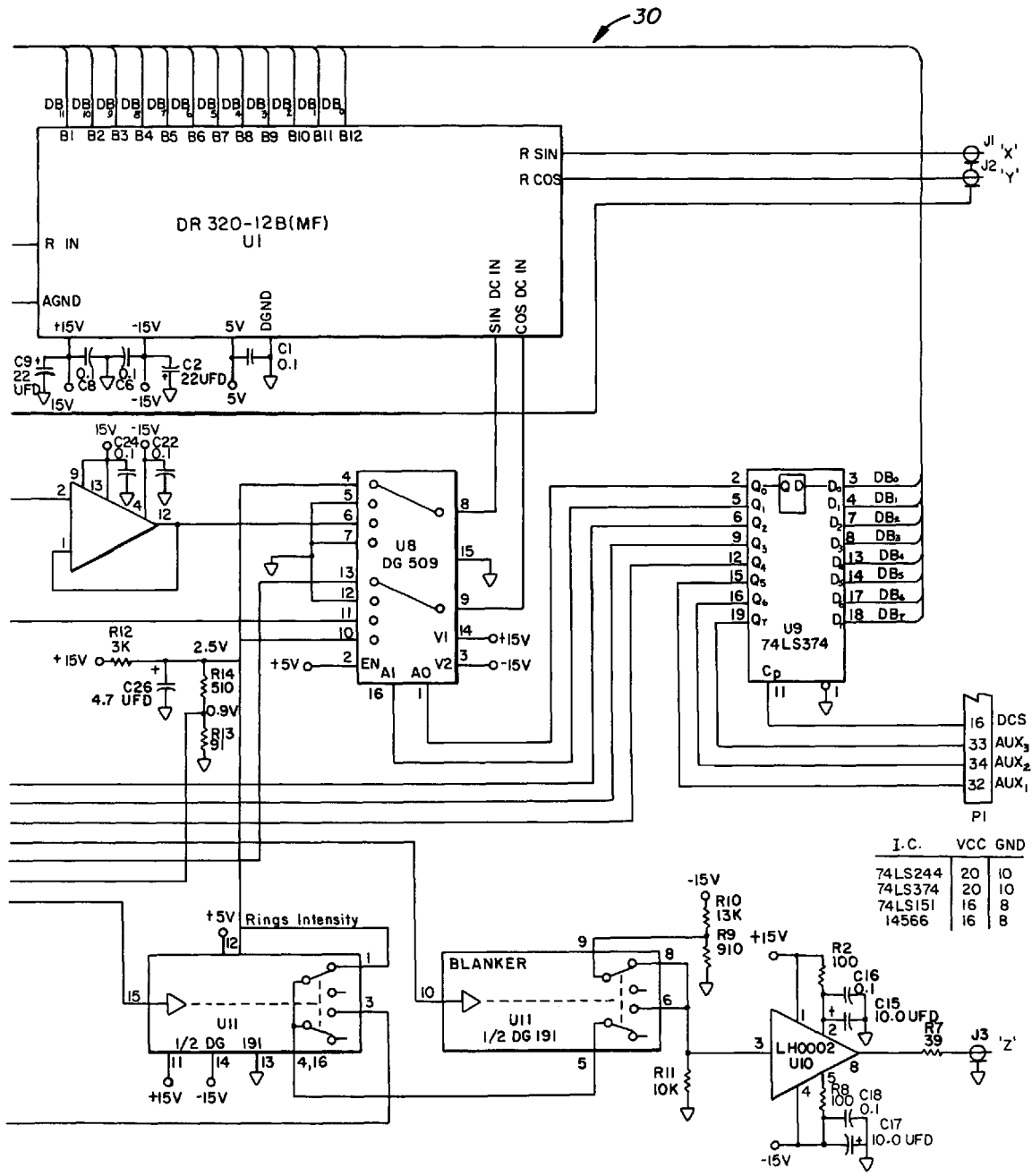

The PPI converter 30 as shown in FIGS. 7a and 7b has as one of its main functions to provide analog sweep information and Z-axis video information to create the necessary picture on the training radar display 100. The inputs to this circuit are both digital and analog. The digital inputs arrive from computer 40 as part of the data bus. These inputs provide three different functions with the first and most used function being the sweep angle.

There are twelve bits required to resolve this sweep angle function. The four most significant bits are unbuffered and go directly to U1, with U1 being a special module that takes digital-angle and analog-range information and does a polar-to-rectilinear conversion. (The outputs from the PPI circuit are R sine data and R cosine data. These outputs drive the X and Y deflection plates in the CRT display in display 100.) The least significant eight bits are buffered by U6 and held in a digital-to-analog converter integrated circuit U5. The data is strobed into this integrated circuit by the signal RSTROBE and the computer supplies the proper digital bits to strobe U5. The U5 is able to provide the analog current that corresponds to the digital input on pin 1. U2 is configured as an integrator and provides the range sweep to U1. The range sweep is properly timed by sweep switch U12. This circuit is driven by the sweep blanking pulses, which will be discussed below.

When the sweep switch is open, U2 is able to charge capacitor C19 in a linear fashion at a rate that depends on the input current supplied by U5. When the end of the sweep arrives, sweep switch U12 closes, shorting capacitor C19 and simultaneously interrupting the input current source to U5 called V ref. Proper sweep-switch timing is dependent on the blanking pulses. The selection of the proper blanking pulse, either BLANKA or BLANKP, is made by the input selector switch U4, which is under control of computer 40.

To summarize the operation of the sweeping circuits, computer 40 first sets an angle where the sweep is to occur, then strobes the proper range rate into U5. The computer then selects the proper length of sweep blanking, either BLANKP or BLANKA, and the rest of the timing is under the control of BLANKA or BLANKP. The third and last function of the circuit of FIGS. 7*a* and 7*b* is mode control, which is latched and held in integrated circuit U9. In order to store the mode of operation on this card computer 40 must present the mode on the data bus and then strobe U9 with a signal called display control strobe (DSS). Of the eight bits presented to this latch, only five are used on this circuit thus leaving three available for other uses on other circuits.

The five circuits used to control this circuit are the blanking mode, whether that be "A" sweep or PPI sweep; the Z-axis mode, which is either video or the Z-axis (as in a standard PPI presentation) or constant intensity, which is required for the "A" sweep mode; range rings, which can be either on or off; and the analog offsetting of output X and Y waveforms, which requires two digital signals to properly set analog switch U8. The first portion of switch U8 is as required by the "A" sweep; X offset in a minus direction is needed to put the starting point of the sweep at the left side of the screen. The Y-axis DC offset is set at zero in this mode. The second position is used in the standard PPI sweep where no offset is required in either the X or the Y direction. Both inputs to switch U8 in the second position are connected to ground. The third position is used for the offset joystick control. In this mode the X-joy and the Y-joy inputs, which are buffered by U7, are connected to the offset inputs of U1 through switch U8. The fourth position is used for signals A367 and A403 and requires an offset at the start of the sweep to the bottom of the screen. In this mode, a voltage is supplied to the Y-offset pin of U1 and the X-offset pin is set to ground.

The AGC video signal coming from video AGC 20 is buffered and the input level reduced by a factor of two. Integrated circuit U13 is used as an inverting amplifier. This video, or minus video as it is called on the schematic, is then available as the offsetting voltage in the Y direction when in the "A" sweep mode. This is a complicated way of describing the standard oscilloscope mode of operation where the video now appears as up and down movement of the beam as the beam traces from left to right. The minus video is AC-coupled into integrated circuit U14, which is a gain control integrated circuit where the gain is manually set by the gain control on the front panel.

The output of U14 is coupled through mode control switch U12. The function of this switch is to either interrupt or supply the video to the Z-axis depending on the mode of operation. If the training radar display is in any of the PPI modes, the video becomes a signal required on the Z-axis to modulate the intensity of the CRT beam in display 100. However, if the training radar display is in the "A" sweep mode, the intensity required on the Z-axis becomes a constant. The resultant waveform passes through half of integrated circuit U11. This is the integrated circuit that is used to intensity-modulate the Z-axis during the range-rings mode of operations.

To understand how range rings occur, an understanding of integrated circuits U3 is necessary. Integrated circuit U3 is a dual function integrated circuit, with the first function being a divide-by-ten counter, and the second being a very short-period one-shot that is triggered by completion of the divide-by-ten operation.

At the beginning of sweep, sweep blanking is high, and the counter chain in U3 is reset on pin 2. As soon as the sweep starts, sweep-blanking drops to a logic low and U3 begins to count the 37 kHz signal (37 kHz having been selected as the clock throughout the training radar display because of the relationship with the speed of light). In other words, if the time for the radar pulse to move four kilometers and return were measured, this time would be exactly the same as the period of a 37 kHz clock. The result of dividing 37 kHz by ten is one pulse every 40 kilometers, which coincides with the range-ring interval selected. At the end of 40 kilometers, the one-shot which is the second half of U3 fires, and generates a short pulse on pin 10. This pulse switches the range ring switch U11 momentarily so that the Z-axis video is changed from normal, video input to a 2½-volt positive voltage, which has the effect of putting a bright dot on the screen.

This range-ring function can be controlled by the ring's-mode switch on pin 9 of U3. The divide-by-ten counter can be enabled or disabled under computer control and can effectively turn on or turn off the range-ring function. The output of the range-ring's switch, on pins 14 and 16 of U11 is supplied to the other half of U11, which is called the blanker switch.

It is necessary to turn off the intensity whenever the beam is to be moved from the outer part of a sweep back to the beginning of a sweep. This step keeps the retrace from distorting or overriding the radar picture that is displayed. The function in U11 is to momentarily disconnect the video and supply a minus voltage (approximately minus one volt) that effectively turns off all beam current in the cathode ray tube within display 100.

The only function remaining for the circuit depicted in FIGS. 7*a* and 7*b* is to buffer the Z-axis information, which is supplied both to the local cathode ray tube and the remote cathode ray tube, with a high-speed, high-current buffer (U10). L1, L2, and L3, and their associated capacitors form the power-supply bypass required on this circuit.

Figure 8A:
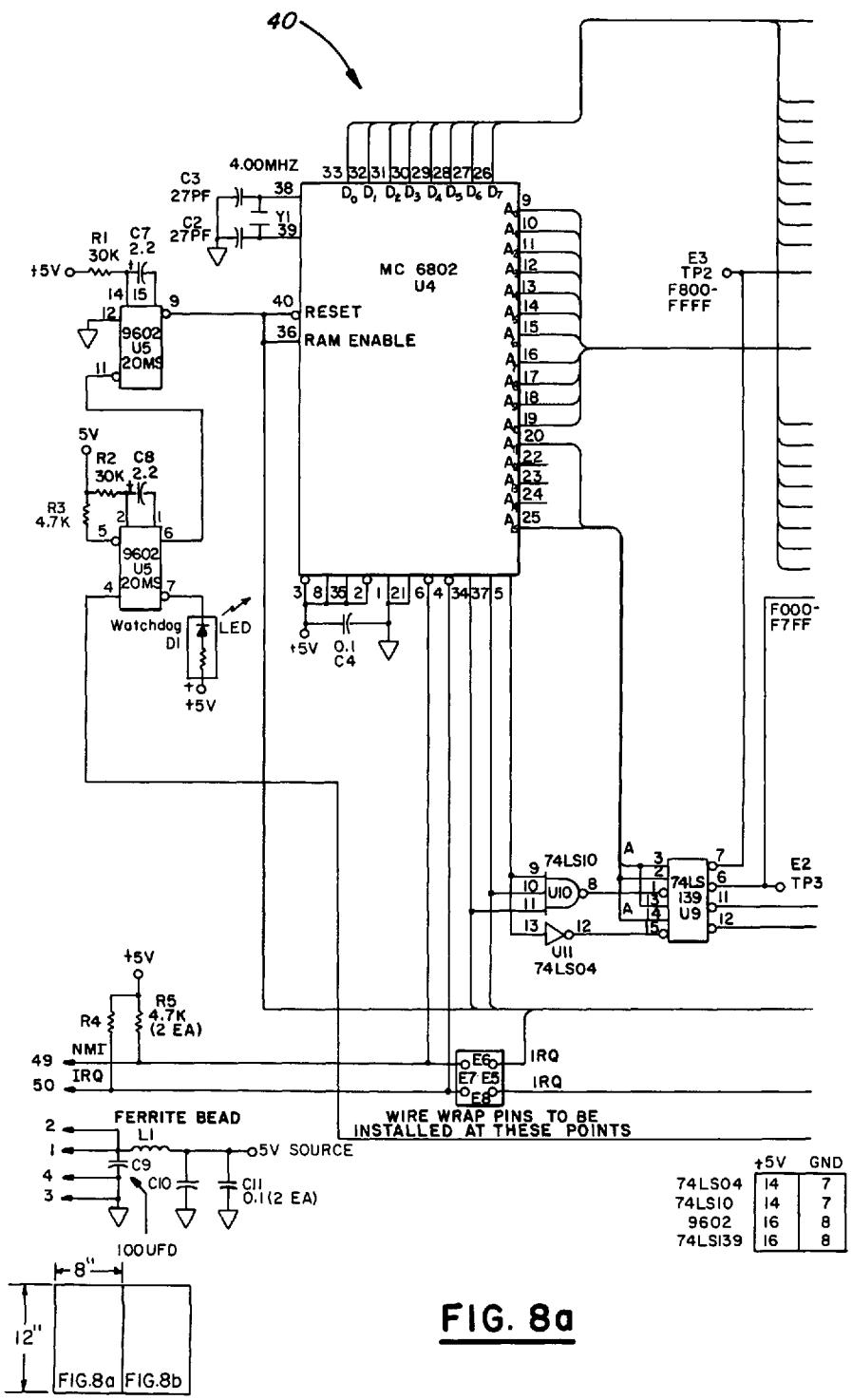
FIGS. 8a and 8b show schematic diagrams of the microcomputer fabricated in accordance with the teachings of this inventive concept.
Figure 8B:
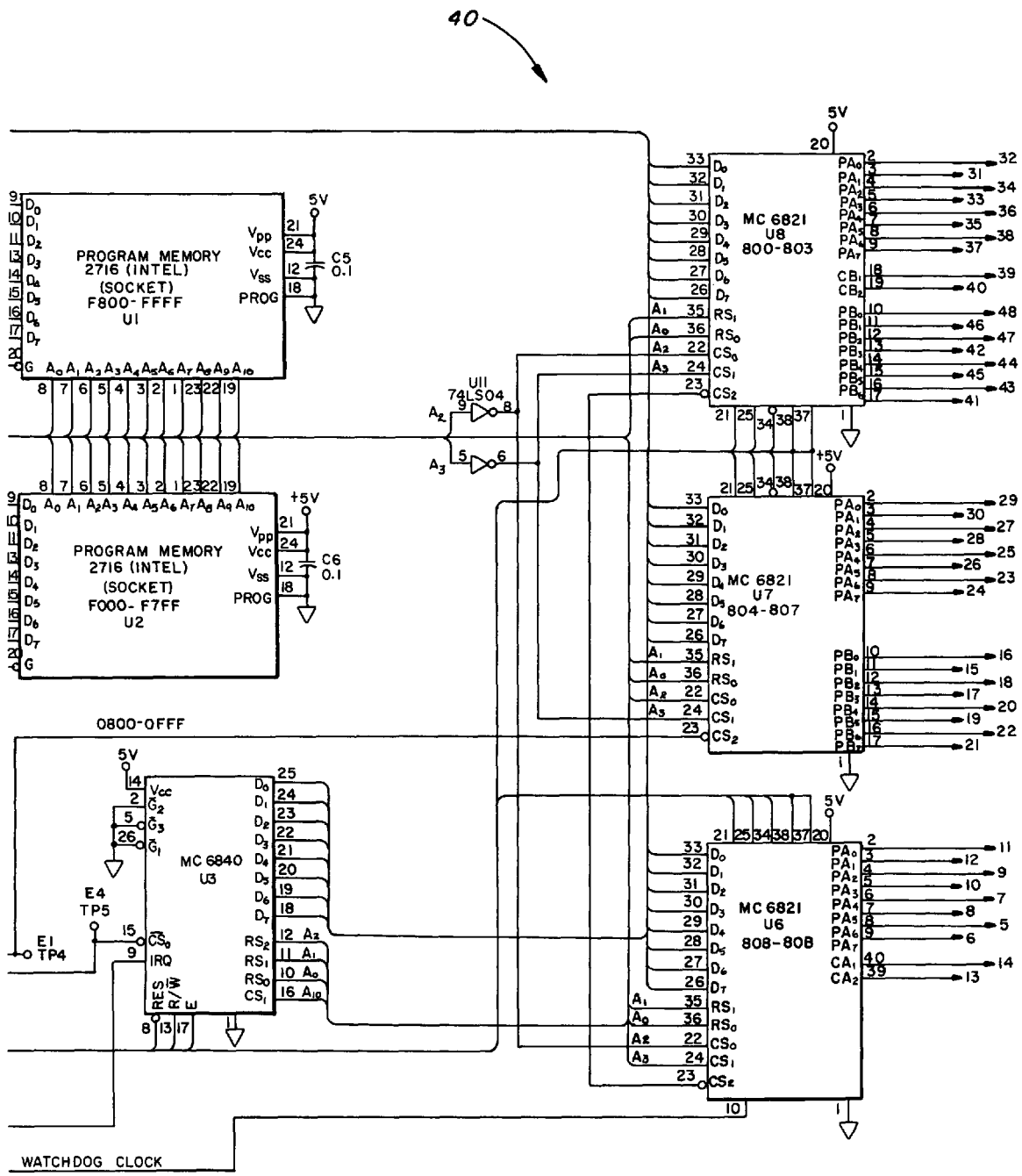

The circuitry of computer 40 is set forth in FIGS. 8*a* and 8*b*. It forms the heart of the training radar display unit. The circuitry is based on microprocessor technology (MC6800), and the actual microprocessor integrated circuit is an MC6802. The philosophy used in developing this circuitry was to provide the maximum number of parallel input and output lines while the circuitry performed necessary hardware timing functions. Enough address space was included for 4,096 bites of program, 2,048 of which are actually used in the training radar display program. The input/output (I/O) lines are unbuffered and are provided by the MC6821. The actual integrated circuits on the board that perform the I/O function are U6, U7, and U8. Of these integrated circuits, U6 is only partially used with the limitations because of the low number of pins available on the edge connector.

The program storage is in erasable, programmable read-only-memory (PROM), part No. 2716. The hardware timer on this board is an MC6840.

In actuality, three timers are available for access by the microprocessor. The address space partitioning is redundant, meaning that not all of the sixteen address lines are used, and the program can reside only in address spaces FOOO HEX through FFFF HEX. The various other address space allocations are notated on the schematic drawing of FIGS. 8a and 8b. The unique feature incorporated in this circuitry is the use of the watchdog timer. The purpose of the watchdog timer is to detect a wild, free-running program, meaning a program not following the desired program path. When this is detected the microprocessor is automatically restarted. The method used to achieve this restart process is to use one output line on U6 as a watchdog clock. This watchdog clock must restart the watchdog timer every 20-ms or the main reset 1-shot will fire, thus resetting the microprocessor. This 20-ms watchdog clock is generated by the training radar display software. When the program is running properly pulses can be seen coming out of pin 10 on U6 at an interval of 20-ms or faster. In actual operation the pulses come at a sporadic rate, sometimes more often than 20-ms. Access is provided at the card edge for both the nonmaskable interrupt (NMI) and the interrupt request lines (IRQ) on pins 49 and 50, respectively.

Since these lines tie directly to the microprocessor, erratic operation can happen if the lines are misused. The proper configuration for the wire-wrap patching, which is made up of test-point pins E5, E6, E7 and E8, is for E5 and E6 to be connected to E8. This interconnection enables interrupt requests, which are generated by the I/O integrated circuits and from the timer, to be vectored to the IRQ on the microprocessor.

Figure 9A:
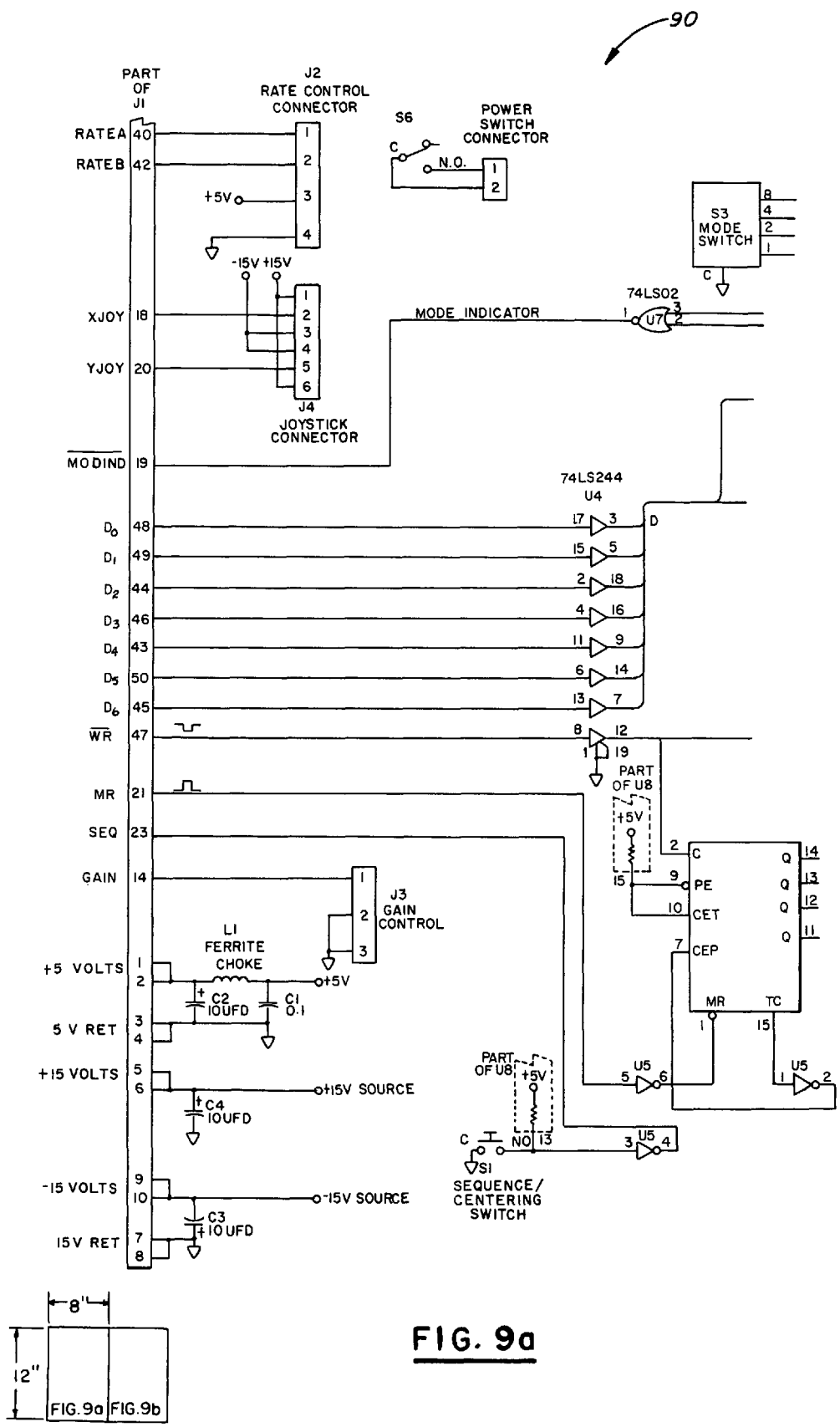
FIGS. 9a and 9b show the control panel in schematic diagram form.
Figure 9B:
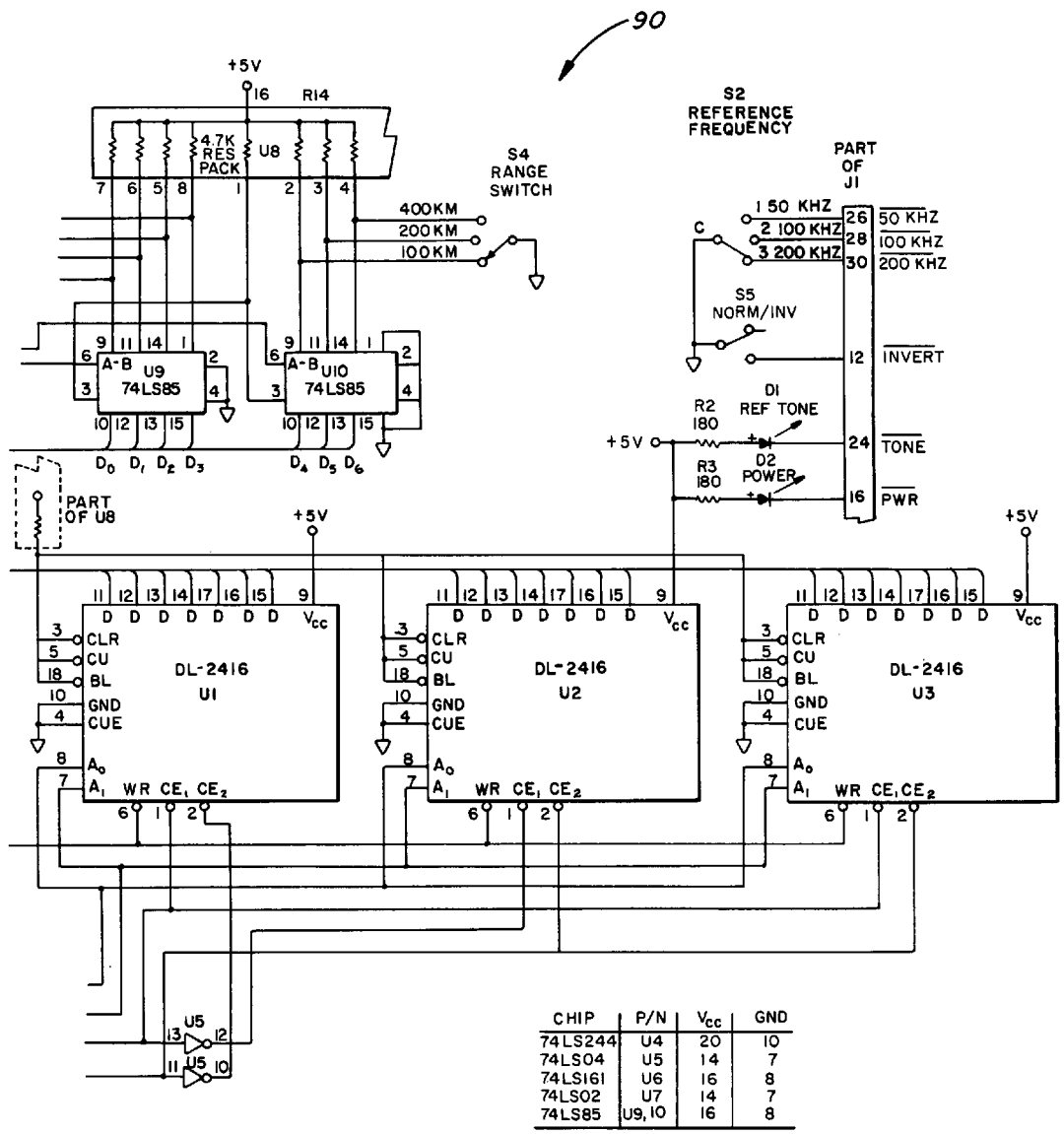

Noting FIGS. 9a and 9b, the function of the circuitry associated with front panel 90 is multipurpose. The electronics function is numeric display generation with mode and range switch interfacing. According to the schematic seven data-bus lines are brought onto the card for several uses. These data bus lines are buffered by integrated circuit U4 and drive multi-digit alphanumeric displays U1, U2, and U3 in a parallel connection. These displays each contain memory latches and display decoders, plus the light emitting diode (LED) display elements. There are four digits within each unit, and the digit address is selected by A0 and A1 on each of the integrated circuits. A counter integrated circuit U6 is used to sequentially address all twelve digits starting from the right-hand end of the digits and proceeding to the left.

In order to write a string of alphanumeric characters the counter integrated circuit is first reset with a pulse on the master reset (MR) line, pin 21 on the connector located on this circuit. The circuit then selects the digit in U3 closest to the right-hand end. Once the proper American Standard Code for Information Interchange (ASCII) code for the displayed digit is entered on the seven data lines, a write pulse is strobed on the WR line. This pulse performs two functions: (1) it enters data into the memory of U3, and (2) it increments the counter of U6, which now addresses the next digit waiting for the proper data to be strobed into that digit's memory.

This sequence of events continues until all twelve digits have been filled. A safety feature is provided so that multiple strobing beyond twelve digits will not override any of the digit's information that has already been entered. The function of providing a safety is performed by disabling the counter integrated circuit at its maximum count.

Other electronic functions occurring are related to the mode switch and the range switch. In order to limit the number of lines required at computer 40 for reading the mode switch or the range switch, the switches are sampled by the computer and when the proper mode sample is output from the computer, a mode indicator $\overline{\text{MODIND}}$ will be a logic "0". An examination of U9 and U10, particularly U9, will reveal that mode switch S3 has four lines and is hex encoded. There are sixteen possible positions in switch S3 and the binary representation of the position selected appears on the four outputs of the mode switch. When the computer puts the same binary representation on D0, D1, D2 and D3, integrated circuit U9 will indicate equivalence between the switch inputs and the computer input by generating a logic "1" on the A-equals-B output. This, then is ORed with the similar output from the comparator looking at the range switch. Either of these comparisons being equal will cause the mode indicator line to be a logic "0". Therefore, the computer can query either or both of the switches in a sequential manner until the mode indicator notifies the computer that the proper setting has been met.

Other functions of the circuitry are merely interconnections for various front-panel controls. For example, the rate control connector is an optical tachometer that requires five volts for power and provides two quadrature square waves on rate A and rate B outputs. These outputs correspond to the rate at which the hold control is being turned. The computer then analyzes these two lines to determine which way the knob is being turned and at what speed it is being turned.

Figure 10:
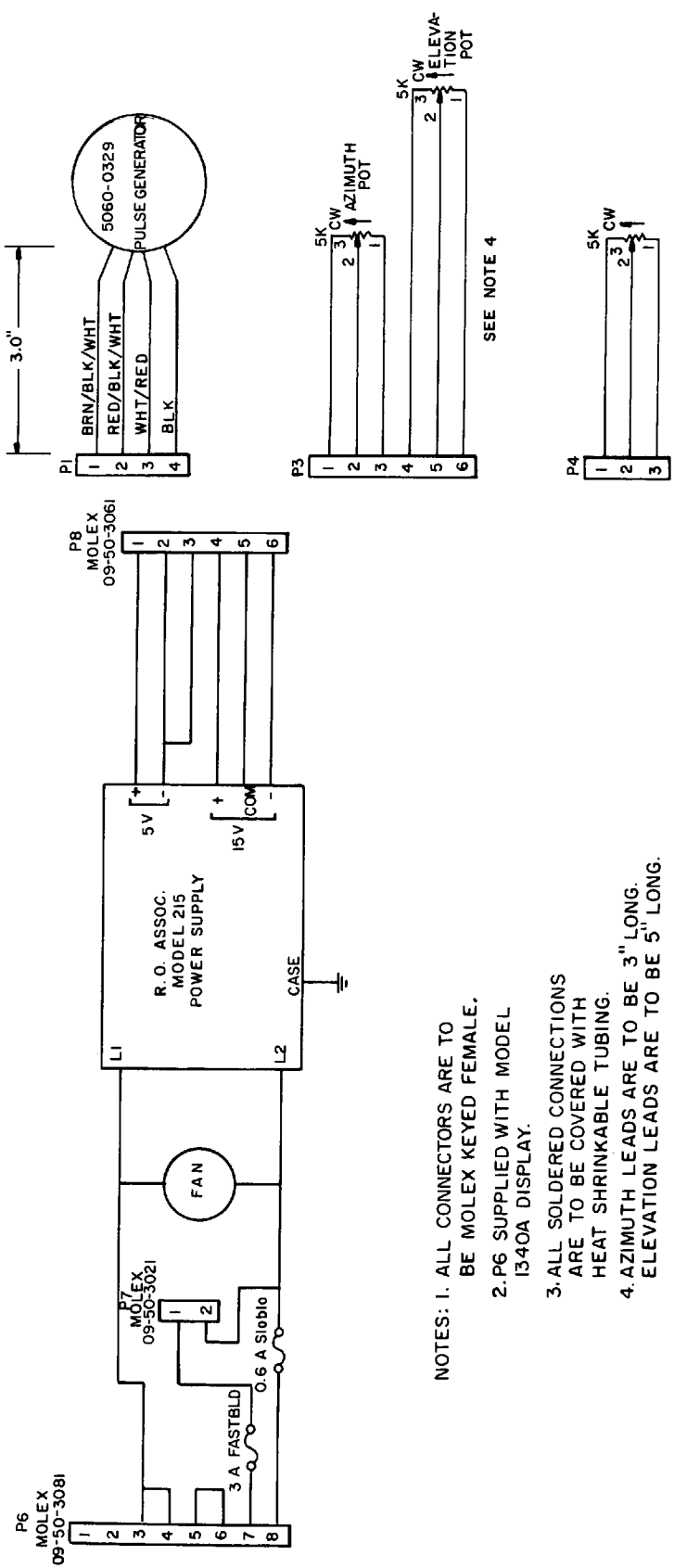
FIG. 10 shows the front panel control wiring diagram.

Looking to FIG. 10, power for the training radar display decoder is derived from the display 100, in this case the HP1340A. The display wiring for the training radar display has been modified to eliminate the capability of accommodating various input line voltages.

The decoder electronics draw approximately 2 A and are fused on the rear panel with 3 A fast-blow fuse. After switching the front panel power switch, the display unit power is passed to the main power supply, to the fan, and to the rear-mounted display fuse. This fuse is the required 0.6 A slow-blow fuse, which is normally mounted internally to the display unit the power for the display unit is supplied back through connector P6.

Obviously many modifications and variations of the present invention are possible in the light of the above teachings. It is therefore to be understood that within the scope of the appended claims the invention may be practiced otherwise than as specifically described.

What is claimed is:

1. A training radar display for decoding and displaying radar signals in different formats, comprising:
   a variable reference frequency means including a tape having a reference tone recorded thereon for providing a reference frequency being variable in accordance with rate of travel fluctuations of the tape, the variable reference frequency thereof is caused by fluctuations of the tape playback rate;
   means connected to the variable reference frequency means for generating a signal that is phase locked to the variable reference frequency;
   means for generating directing signals;

means coupled to the phase locked signal outputting means and the directing signal's generating means for synthesizing a fine tuned signal based on the output signal of the phase locked signal generating means in accordance with the signals received from the directing signal's generating means;

means providing video signals;

means disposed to receive a video input signal from the video signal providing means for producing a sense directed gain controlled video signal;

a plan position indicator converter coupled to receive the video output of the producing means and to process the video output from polar to rectilinear coordinates in accordance with signals received from the directing signal's generating means;

means coupled to the plan position indicator converter and to receive the special purpose timing signal from the using means for presenting a display thereof; and a control panel connected to the directing signal's generating means, the video input producing means, the plan position indicator converter and presenting means to provide for input direction from the directing signal generating means.

2. An apparatus according to claim 1 in which the video signal providing means is a recording on the same tape as the variable reference frequency means alongside and in the same time frame thereof.

3. An apparatus according to claim 2 in which the phase locked signal outputting means is a phase locked oscillator and the directing signal's generating means is a control computer.

4. An apparatus according to claim 3 in which the synthesizing means is a frequency synthesizer, the using means is a timing generating and the presenting means is a video display unit.

5. An apparatus according to claim 4 in which the phase locked oscillator is fabricated to generate a 10 MHz signal and the frequency synthesizer is composed of elements to generate a 50 KHz signal in response thereto and the control computer.

6. An apparatus according to claim 5 in which the phase-lock outputting means includes means for determining when phase-lock to the variable reference tone has occurred.

7. An apparatus according to claim 6 in which the phase-lock outputting means includes an internal crystal generating a stable reference frequency tone that is coupled to the phase-lock determining means to be actuated when no variable reference tone is being received.

8. An apparatus according to claim 7 in which the internal crystal passes a 10 MHz stable signal for the interconnected circuitry of the display control unit to permit operation thereof in other modes than when a variable reference tone is provided.

9. An apparatus according to claim 8 in which the plan position indicator converter provides analog sweep information and Z axis video information to create the picture on an interconnected display unit.

* * * * *